United States Patent
Seo

(10) Patent No.: US 9,844,015 B2
(45) Date of Patent: Dec. 12, 2017

(54) METHOD FOR TRANSMITTING SYNCHRONIZATION SIGNAL FOR DIRECT DEVICE-TO-DEVICE COMMUNICATION IN WIRELESS COMMUNICATION SYSTEM, AND APPARATUS FOR SAME

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/119,079

(22) PCT Filed: Feb. 25, 2015

(86) PCT No.: PCT/KR2015/001812
§ 371 (c)(1),
(2) Date: Aug. 15, 2016

(87) PCT Pub. No.: WO2015/130074
PCT Pub. Date: Sep. 3, 2015

(65) Prior Publication Data
US 2017/0048811 A1    Feb. 16, 2017

Related U.S. Application Data

(60) Provisional application No. 61/945,795, filed on Feb. 27, 2014, provisional application No. 61/945,793, filed on Feb. 27, 2014.

(51) Int. Cl.
*H04M 1/00* (2006.01)
*H04W 56/00* (2009.01)
*H04W 72/12* (2009.01)
*H04W 88/16* (2009.01)

(52) U.S. Cl.
CPC ..... *H04W 56/002* (2013.01); *H04W 72/1215* (2013.01); *H04W 72/1289* (2013.01); *H04W 88/16* (2013.01)

(58) Field of Classification Search
CPC ........... H04W 56/002; H04W 72/1215; H04W 72/1205; H04W 72/1289
USPC ...................................... 455/552.1
See application file for complete search history.

(56) References Cited

U.S. PATENT DOCUMENTS

| 2007/0258404 A1 | 11/2007 | Tirkkonen et al. |
| 2013/0148566 A1 | 6/2013 | Doppler et al. |
| 2013/0155974 A1 | 6/2013 | Papasakellariou et al. |

FOREIGN PATENT DOCUMENTS

| WO | WO 2010/082797 A2 | 7/2010 |
| WO | WO 2013/055271 A1 | 4/2013 |

*Primary Examiner* — Eugene Yun
(74) *Attorney, Agent, or Firm* — Birch, Stewart, Kolasch & Birch, LLP

(57) ABSTRACT

Disclosed in the present application is a method for a terminal transceiving signals through direct device-to-device communication in a wireless communication system. More specifically, the method comprises the steps of: receiving, from a specific node, a synchronization signal including a designated indicator; selecting, an SA resource for transmitting an SA signal, from a scheduling assignment (SA) resource pool which corresponds to the designated indicator; and transmitting the SA signal using the selected SA resource, wherein the SA resource pool is independently configured for each value of the designated indicator.

12 Claims, 9 Drawing Sheets

(a) contol - plane protocol stack (b) user - plane protocol stack

D2D signal is transmitted from UE to which resource unit #0 is allocated (a)

(b)

METHOD FOR TRANSMITTING SYNCHRONIZATION SIGNAL FOR DIRECT DEVICE-TO-DEVICE COMMUNICATION IN WIRELESS COMMUNICATION SYSTEM, AND APPARATUS FOR SAME

CROSS REFERENCE TO RELATED APPLICATIONS

This application is the National Phase of PCT International Application No. PCT/KR2015/001812, filed on Feb. 25, 2015, which claims priority under 35 U.S.C. 119(e) to U.S. Provisional Application No. 61/945,795, filed on Feb. 27, 2014 and 61/945,793, filed on Feb. 27, 2014, all of which are hereby expressly incorporated by reference into the present application.

TECHNICAL FIELD

The present invention relates to a wireless communication system, and more particularly, to a method of transmitting a synchronization signal for direct device-to-device communication in a wireless communication system and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the aforementioned discussion, a method of transmitting a synchronization signal for direct device-to-device communication in a wireless communication system and an apparatus therefor are proposed in the following description.

Technical Solution

To achieve these and other advantages and in accordance with the purpose of the present invention, as embodied and broadly described, according to one embodiment, a method for transmitting and receiving, a user equipment, a signal through direct device-to-device communication in a wireless communication system, the method comprising: receiving a synchronization signal including a prescribed indicator from a specific node; selecting an scheduling assignment (SA) resource for transmitting an SA signal from an SA resource pool corresponding to the prescribed indicator; and transmitting the SA signal using the selected SA resource, wherein the SA resource pool is independently configured by each of values of the prescribed indicator.

To further achieve these and other advantages and in accordance with the purpose of the present invention, according to a different embodiment, a user equipment performing direct device-to-device communication in a wireless communication system, the user equipment comprising: a radio frequency (RF) module configured to transceive a signal with a network or a different user equipment; and a processor configured to process the signal, the processor configured to control the RF module to receive a synchronization signal including a prescribed indicator from the network or the different user equipment and transmit an scheduling assignment (SA) signal using an SA resource selected from an SA resource pool corresponding to the prescribed indicator, wherein the SA resource pool is independently configured by each of values of the prescribed indicator.

In the embodiments, the user equipment can select a data channel resource from a data channel resource pool and transmit a data channel using the selected data channel resource. In this case, the data channel resource pool can be commonly configured by a value of the prescribed indicator. Preferably, the SA signal can include information on the selected data channel resource.

More preferably, the prescribed indicator may indicate a count of relaying the synchronization signal or may indicate whether the specific node transmitting the synchronization signal is located in coverage.

In addition, the user equipment can relay the synchronization signal including the prescribed indicator to a different node. Or, the user equipment can relay the synchronization signal to a different node. In this case, an indicator included in the synchronization signal may have a value increased as much as a predetermined value compared to the prescribed indicator.

Advantageous Effects

According to embodiments of the present invention, it is able to efficiently transmit and receive a synchronization signal of direct device-to-device communication.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

In the present specification, a name of a base station can be used as a comprehensive terminology including an RRH (remote radio head), an eNB, a TP (transmission point), an RP (reception point), a relay, and the like.

Figure 1:
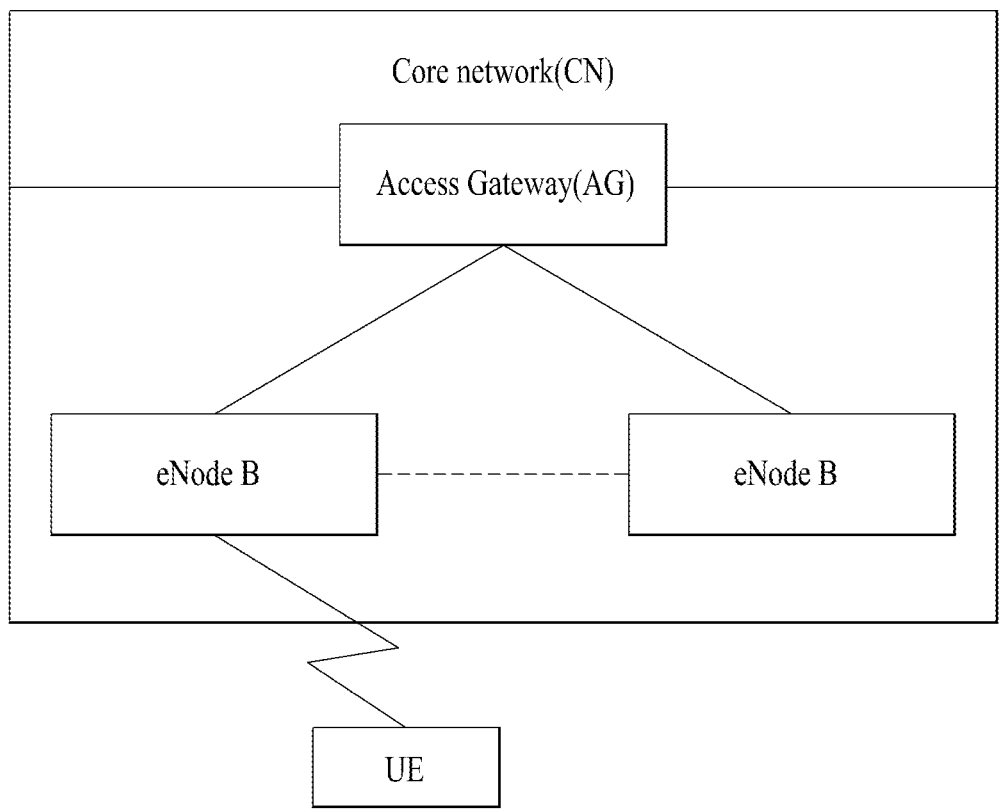
FIG. 1 is a schematic diagram of E-UMTS network structure as one example of a wireless communication system.
Figure 2:
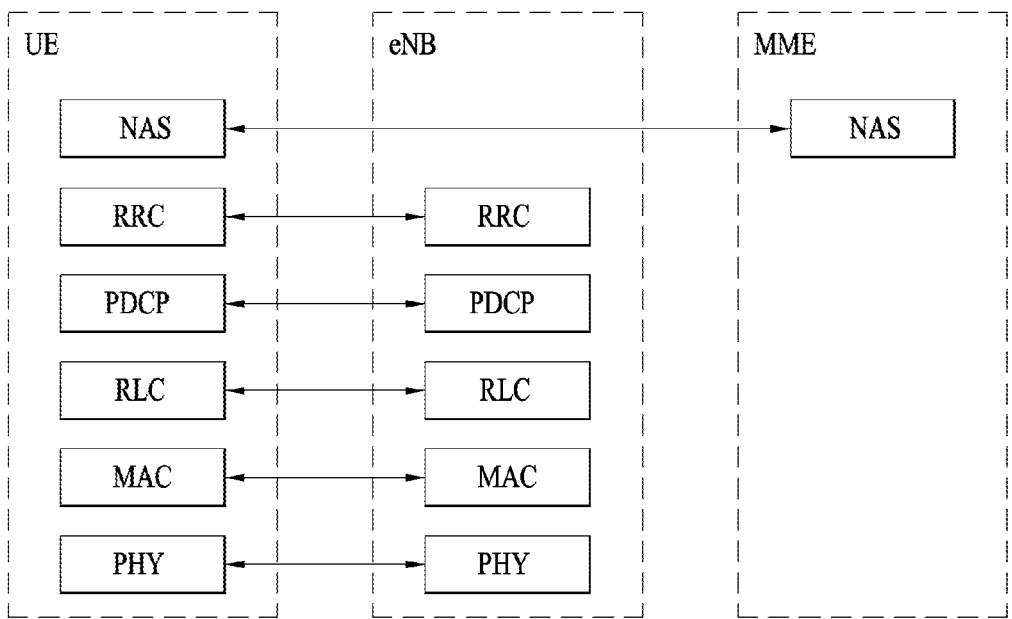
FIG. 2 is a diagram illustrating structures of a control plane and a user plane of a radio interface protocol between a user equipment and E-UTRAN based on the 3GPP radio access network standard.
Figure 2:
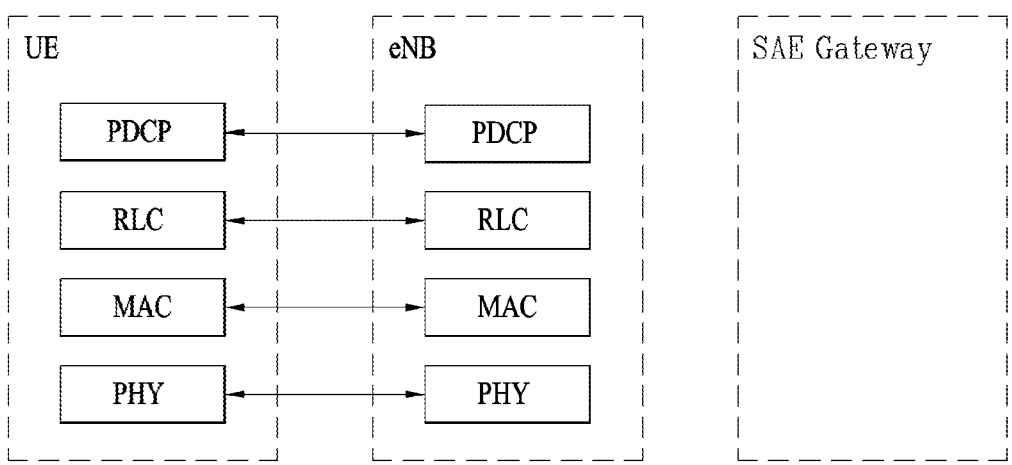

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. If there is RRC connection between a user equipment and an RRC layer of a network, the user equipment is in an RRC connected mode. Otherwise, the user equipment is in an RRC idle mode. A NAS (non-access stratum) layer, which is located at the top of the RRC layer, performs such a function as session management and mobility management.

One cell constituting a base station (eNB) is set to one of bandwidths of 1.4, 3.5, 5, 10, 15, and 20 MHz and provides a downlink or uplink transmission service to several user equipments. At this time, different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
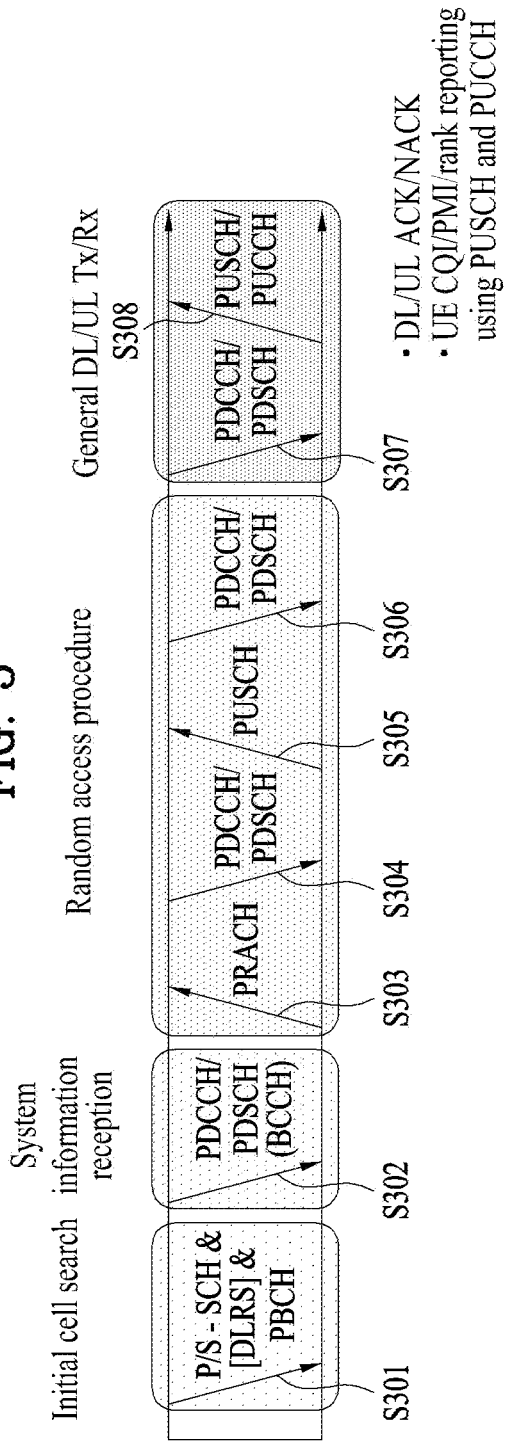
FIG. 3 is a diagram illustrating physical channels used in a 3GPP LTE system and a general method for transmitting a signal using the physical channels.

FIG. 3 is a diagram showing physical channels used in a 3GPP system and a general signal transmission method using the same.

When a UE is powered on or enters a new cell, the UE performs an initial cell search operation such as synchronization with an eNB (S301). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S302).

When the UE initially accesses the eNB or has no radio resources for signal transmission, the UE may perform a random access procedure (RACH) with respect to the eNB (steps S303 to S306). To this end, the UE may transmit a specific sequence as a preamble through a physical random access channel (PRACH) (S303 and S305) and receive a response message to the preamble through the PDCCH and the PDSCH corresponding thereto (S304 and S306). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S308), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
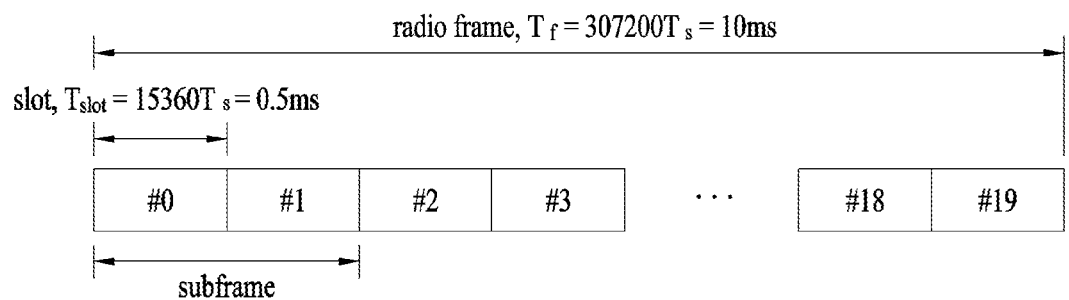
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_S$ indicates a sampling time and is represented as $T_S = 1/(15 \text{ kHz } 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
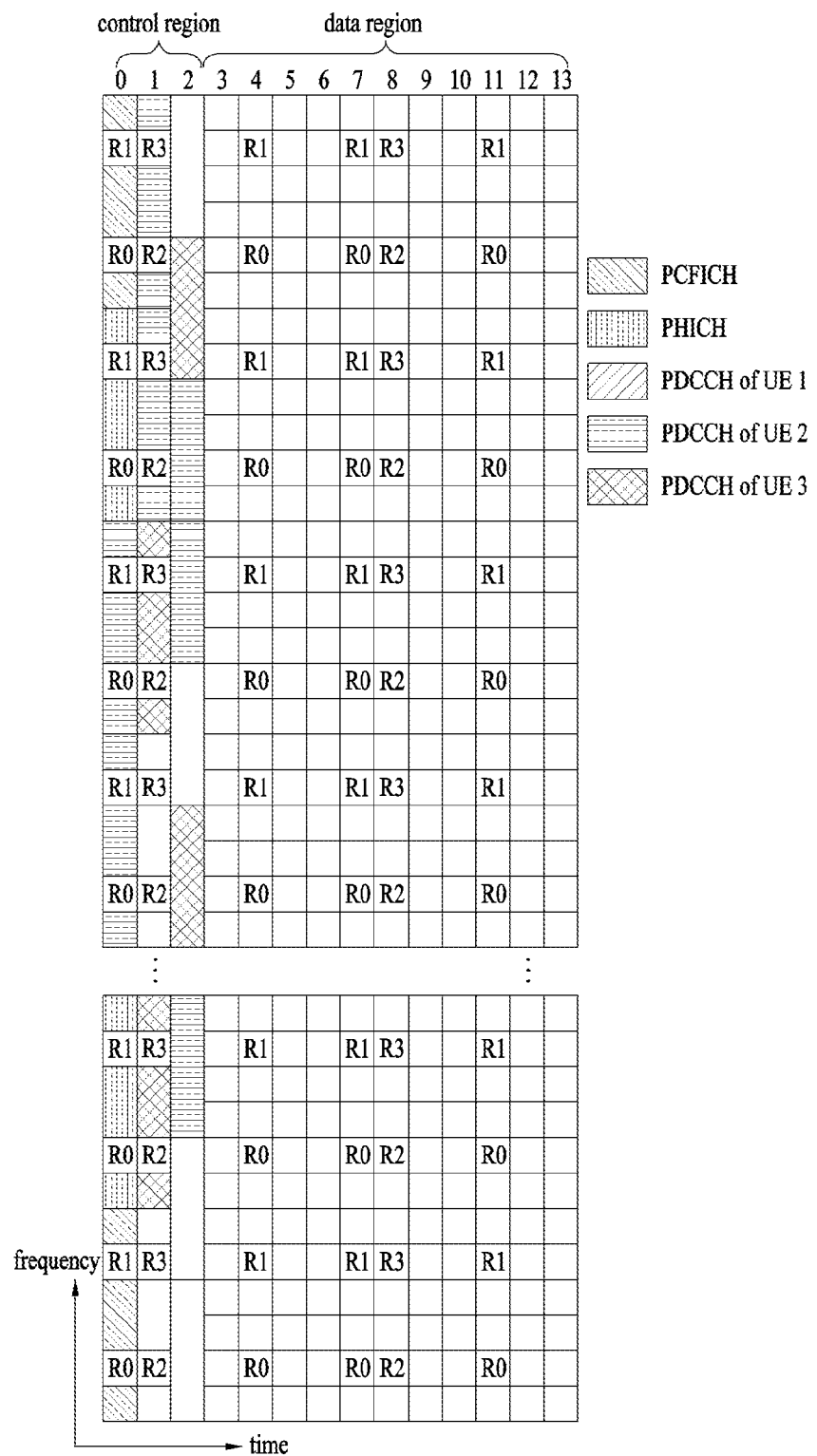
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
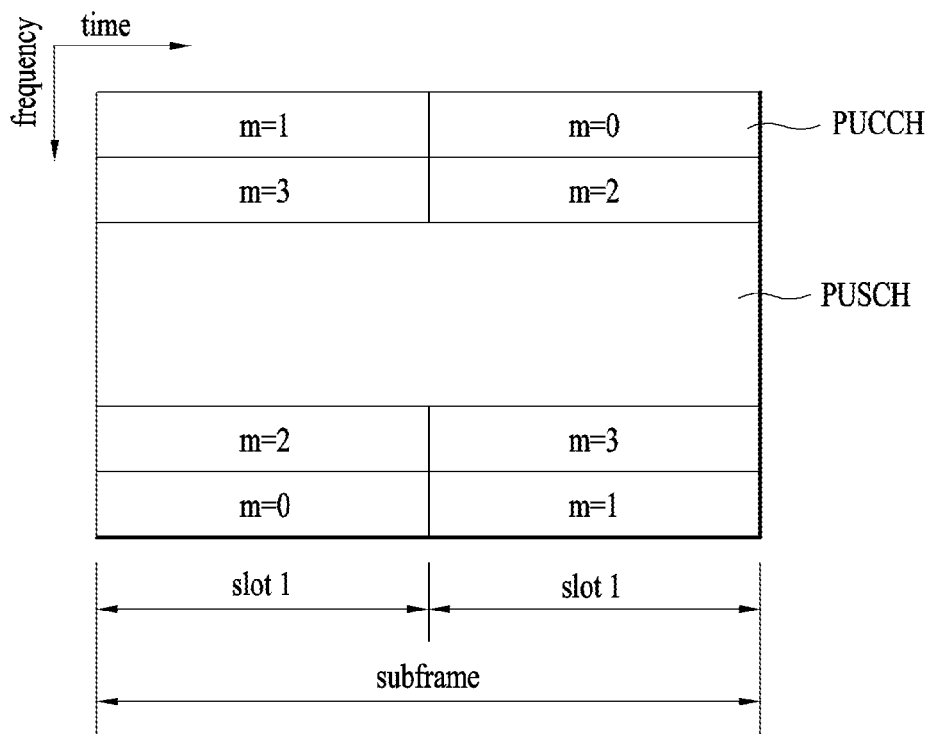
FIG. 6 is a diagram illustrating a structure of an uplink subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
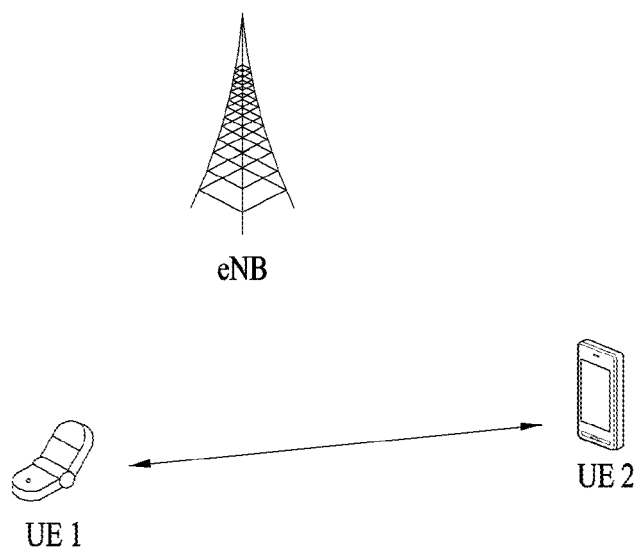
FIG. 7 is a conceptual diagram illustrating direct device-to-device communication.

FIG. 7 is a conceptual diagram illustrating direct device-to-device communication.

Referring to FIG. 7, in D2D (device-to-device) communication that a UE performs direct wireless communication with a different UE, i.e., direct device-to-device communication, an eNB can transmit a scheduling message for indicating D2D transmission and reception. A UE participating in the D2D communication receives a D2D scheduling message from the eNB and performs a transmission and reception operation indicated by the D2D scheduling message. In this case, although the UE corresponds to a terminal of a user, if such a network entity as an eNB transmits and receives a signal according to a communication scheme between UEs, the network entity can also be considered as a sort of UEs. In the following, a link directly linked between UEs is referred to as a D2D link and a link used for a UE to communicate with an eNB is referred to as an NU link.

In order to perform a D2D operation, a UE performs a discovery procedure to identify whether or not a counterpart UE is located at a near area capable of performing D2D communication. The discovery procedure is performed in a manner that a UE transmits a unique discovery signal capable of identifying the UE and a neighboring UE identifies the UE, which has transmitted the discovery signal, located at a near location by detecting the discovery signal. In particular, each UE checks whether or not a counterpart UE exists at a near location via the discovery procedure and performs D2D communication transmitting and receiving an actual user data.

Meanwhile, a case that a UE 1 selects a resource unit corresponding to a specific resource from a resource pool corresponding to a set of a series of resources and a D2D signal is transmitted using the selected resource unit is explained in the following. In this case, In this case, if the UE 1 is located within coverage of a base station, the base station can inform the UE 1 of the resource pool. If the UE 1 is located at the outside of the coverage of the base station, a different UE may inform the UE 1 of the resource pool or the resource pool can be determined by resources determined in advance. In general, a resource pool consists of a plurality of resource units. Each UE selects one or a plurality of resource units and may be then able to use the selected resource unit(s) to transmit a D2D signal of the UE.

Figure 8:
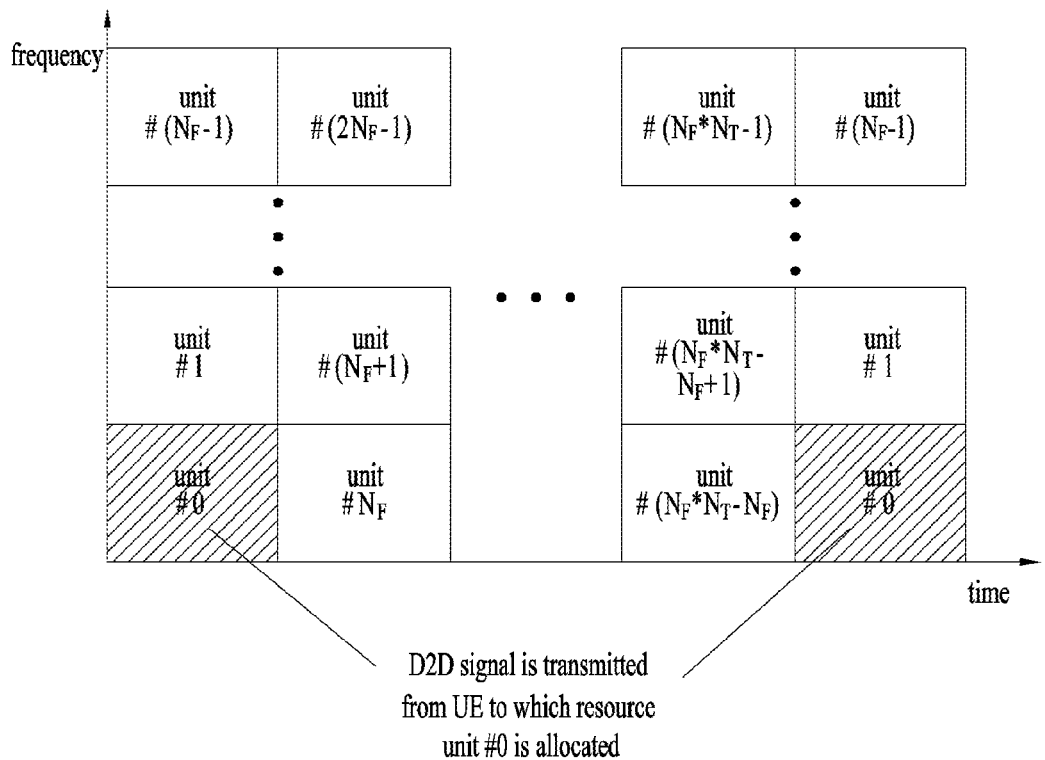
FIG. 8 is a diagram illustrating an example of configuring a resource pool and a resource unit.

FIG. 8 is a diagram illustrating an example of configuring a resource pool and a resource unit.

Referring to FIG. 8, it shows a case that the $N_F*N_T$ number of resource units in total are defined in a manner that the total frequency resources are divided into $N_F$ number of frequency resources and the total time resources are divided into $N_T$ number of time resources. In particular, it is able to see that a corresponding resource pool is repeated with a period of $N_T$ subframe. Specifically, a resource unit can periodically and repeatedly appear. Or, in order to obtain diversity gain in time or frequency domain, an index of a physical resource unit to which a logical resource unit is mapped may change with a predetermined pattern according to time. In this resource unit structure, a resource pool may correspond to a set of resource units capable of being used by a UE intending to transmit a D2D signal.

The aforementioned resource pool can be segmented into various types. First of all, the resource pool can be distinguished from each other according to content of a D2D signal transmitted from each resource pool. As an example, as shown in 1) to 3) in the following, the content of the D2D signal can be divided into an SA, a D2D data channel and a discovery signal. A separate resource pool can be configured according to each of the contents.

1) SA (scheduling assignment): corresponds to a signal including information on a resource position used by each transmission UE for a D2D data channel to be transmitted and information on MCS (modulation and coding scheme), MIMO transmission scheme and the like necessary for demodulating a D2D data channel. The SA can be transmitted on an identical resource unit in a manner of being multiplexed with D2D data. In this case, an SA resource pool may correspond to a resource pool in which the SA is transmitted in a manner of being multiplexed with D2D data.

2) D2D data channel: corresponds to a channel used by a transmission UE to transmit user data. If it is possible to transmit SA and D2D data on an identical resource unit in a manner of multiplexing the SA and the D2D data together, a resource element (RE), which was used to transmit SA information on a specific resource unit within an SA resource pool, can also be used to transmit D2D data in a D2D data channel resource pool.

3) Discovery signal: corresponds to a resource pool for a signal that enables a neighboring UE to discover a transmission UE. The transmission UE transmits such information as an ID of the transmission UE and the like to the neighboring UE to make the neighboring UE discover the transmission UE.

Meanwhile, although the aforementioned contents of the D2D signal are identical to each other, it may be able to use a different resource pool according to a transmission and reception property of the D2D signal. For example, an identical D2D data channel or a discovery message can be identified as a different resource pool according to a scheme of determining transmission timing of a D2D signal, a scheme of allocating a resource, or a signal format.

In this case, for example, the scheme of determining transmission timing of a D2D signal can be determined based on whether a D2D signal is transmitted at the timing of receiving a synchronization reference signal or whether a D2D signal is transmitted at the timing of receiving the synchronization reference signal to which prescribed TA (timing advance) is applied. And, for example, the scheme of allocating a resource can be determined based on whether an eNB designates a transmission resource of an individual D2D signal to an individual transmission UE or whether an individual transmission UE randomly selects an individual signal transmission resource from a resource pool. Lastly, for example, the signal format can be determined based on the number of symbols occupied by a D2D signal in a subframe or the number of subframes used for transmitting a D2D signal.

Meanwhile, since synchronization of UEs belonging to the coverage of an eNB is matched with an eNB signal, it is able to perform D2D communication without a separate synchronization procedure. Yet, in order to perform D2D communication at the outside of the coverage of the eNB, it is necessary to transmit a separate synchronization signal between UEs. A synchronization signal transmitted by a UE for D2D communication may be referred to as a D2DSS (D2D synchronization signal). In this case, coverage of a D2DSS transmitted by a single UE can be restricted by transmit power of the UE and the like. Hence, in order for UEs distributed to a wider area to match synchronization with a single synchronization source, the D2DSS can be relayed by the UEs.

In particular, if a specific UE initially transmits a D2DSS, all or a part of UEs receive the D2DSS. Having received the D2DSS, all or a part of UEs match synchronization of the UEs with the D2DSS and transmit the D2DSS according to the synchronization (this can be regarded as relay of the D2DSS). By doing so, it may be able to have an effect of delivering a time/frequency synchronization configured by an initial UE via multi-hops. In this case, a UE relaying a D2DSS can notify that the D2DSS transmitted by the UE correspond to a relayed D2DSS. As an example, it may be able to utilize a hop count for relaying a D2DSS when a D2DSS sequence is selected. Or, it may be able to deliver the hop count via a synchronization channel which is transmitted together with the D2DSS.

Figure 9:
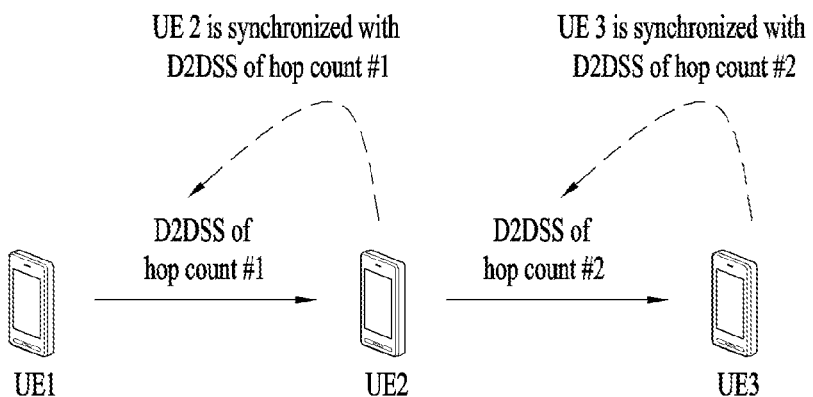
FIG. 9 is a diagram illustrating an example that a D2DSS is relayed according to embodiment of the present invention.

FIG. 9 is a diagram illustrating an example that a D2DSS is relayed according to embodiment of the present invention.

Referring to FIG. 9, it is able to see that a D2DSS initially transmitted by a UE 1 is delivered to a UE 3 via relaying of a UE 2 and the UE 1, the UE 2 and the UE 3 are all able to obtain synchronization. Each of the UEs transmits an SA based on the synchronization and transmits a D2D data channel. By doing so, D2D communication is enabled among the UEs.

In case of relaying the D2DSS, time of transmitting the D2DSS can be distinguished from each other according to a hop count. In the aspect of the UE 2 shown in FIG. 9, since it is necessary for the UE 2 to receive a D2DSS of a hop count #1 and transmit a D2DSS of a hop count #2 at a different timing based on the D2DSS of the hop count #1, it is preferable to distinguish timings of transmitting a D2DSS with each other according to a hop count.

As mentioned in the foregoing description, the present invention proposes a method of transmitting an SA when a D2DSS is multi-hop relayed via UEs.

Embodiment 1

First of all, as a first embodiment, the present invention proposes to configure a separate SA resource pool corresponding to a D2DSS of each hop count. Regarding this, it shall be explained in more detail with reference to a drawing.

Figure 10:
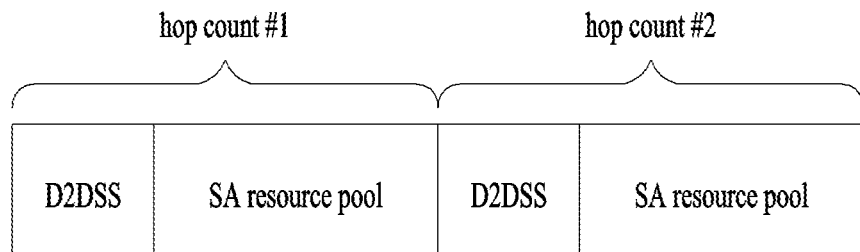
FIG. 10 is a diagram illustrating an example that a separate SA resource pool corresponding to a D2DSS is configured in every hop count according to a first embodiment of the present invention.
Figure 10:
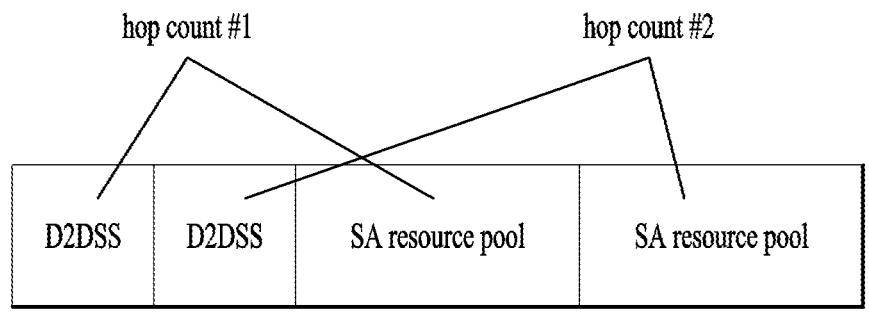

FIG. 10 is a diagram illustrating an example that a separate SA resource pool corresponding to a D2DSS of each hop count is configured according to a first embodiment of the present invention.

In particular, FIG. 10 (a) shows a case that a D2DSS of a hop count appears and then an SA resource pool of the hop count appears in succession. FIG. 10 (b) shows a case that a series of D2DSSs are preferentially arranged and then an SA resource pool of each hop count appears. As a special configuration of FIG. 10 (a), a D2DSS corresponding to each hop count and an SA resource pool can be implemented in a form of respectively occupying a different symbol of a subframe.

As mentioned in the foregoing description, if there exists an SA resource pool corresponding to each hop count, an operation of a transmission UE can be defined by a) to c) described in the following. In a broad sense, it may be able to consider a different scheme depending on whether the transmission UE transmits an SA in a single SA resource pool only or a plurality of SA resource pools. Additionally, as a variance of the embodiment 1, it may have a case that there exists a single SA resource pool corresponding to a D2DSS of a partial hop count among a plurality of hop counts and there exists a different SA resource pool corresponding to a D2DSS of another partial hop count. A hop count mentioned in the present invention may correspond to a coverage indicator for indicating whether a signal corresponds to an internal signal of coverage of a base station or an external signal of the coverage of the base station.

a) First of all, it may consider a scheme that a transmission UE transmits an SA in a single SA resource pool only. Generally, according to the scheme, it may reduce transmission count of an SA of the transmission UE, thereby reducing resource consumption amount occupied by an SA and reducing a collision between SAs.

If a hop count of a D2DSS with which synchronization of a transmission UE is matched corresponds to n, it may be able to regulate the transmission UE to transmit an SA in an SA resource pool corresponding to a hop count # (n+x) only. A UE initially transmitting a D2DSS considers a hop count of a D2DSS with which synchronization of the UE is matched as 0 and may be able to use an SA resource pool corresponding to a hop count #x.

In general, a UE can detect a plurality of D2DSSs. In this case, the UE selects a single D2DSS on the basis of transmission synchronization of the UE and determines an SA resource pool to be used according to a hop count of the selected D2DSS. In this case, x corresponds to a predetermined integer. In general, the x can be set to 1, by which the present invention may be non-limited. The x may correspond to a random integer equal to or greater than 0.

As an additional condition for the aforementioned operation, if a transmission UE transmits a D2DSS of a hop count #n, it may be able to regulate the transmission UE to transmit an SA in an SA resource pool corresponding to the D2DSS of the hop count #n only. In particular, it might say that the above-mentioned operation follows a principle that an SA is delivered to a UE capable of receiving a D2DSS transmitted by a corresponding only under an assumption that an area to which a D2DSS is delivered by an individual transmission UE and an area to which an SA is delivered are similar to each other.

When a UE receives a D2DSS of a hop count #n and matches transmission synchronization of the UE with the D2DSS, if a hop count of a D2DSS transmitted by the UE corresponds to n+1 all the time and x corresponds to 1, this condition becomes identical to the aforementioned condition. Otherwise, one of the two conditions can be preferentially applied. For example, a UE transmitting a D2DSS uses an SA resource pool corresponding to a hop count of the D2DSS transmitted by the UE. On the contrary, other UEs may be able to use an SA resource pool interlocked with a D2DSS of which x is added to a hop count of a D2DSS which becomes a reference for D2D data channel transmission synchronization of the UE.

b) It may also be able to consider that a transmission UE transmits an SA in an SA resource pool interlocked with hop counts of all D2DSSs. Hence, if a reception UE selects a D2DSS hop count where it is easy for the reception UE to receive an SA, the reception UE can receive an SA at the hop count only. Hence, it is O.K. to omit reception in the rest of SA resource pools. By doing so, it is able to reduce power consumption of the reception UE.

For example, if a reception UE selects a D2DSS of a hop count #n from among a series of D2DSSs generated from an initial UE on the basis of reception of a D2D signal, the reception UE may attempt to receive an SA in an SA resource pool corresponding to the hop count #n only. Of course, since a corresponding UE transmits a single D2D data channel, SAs transmitted from a plurality of SA resource pools should indicate an identical resource.

c) Lastly, it may be able to consider a scheme that a transmission UE transmits an SA in a partial SA resource pool among a plurality of SA resource pools. This scheme may correspond to a compromised form of the a) and the b) scheme. Practically, since an area to which a D2DSS of a transmission UE is delivered is unable to include all areas to which an SA is transmitted, a UE transmitting a D2DSS of a hop count #n can transmit an SA in an SA resource pool corresponding to D2DSSs of a hop count #(n−y1), #(n−y1+1), . . . , #n, #(n+1), . . . , #(n+y2). In this case, on the basis of the hop count #n of the D2DSS transmitted by the UE, it may follow a principle that a UE entering between hop count #(n−y1) and #(n+y2) can receive the SA of the UE only.

Similar to the scheme a), a UE not transmitting a D2DSS assumes that a D2DSS of a hop count of which x is added to a hop count of a D2DSS, which becomes a reference for D2D data channel transmission synchronization of the UE, is transmitted by the UE and may be able to use an SA resource pool according to the aforementioned scheme.

In the following, in a situation that a D2DSS is relayed, one embodiment of applying the aforementioned principle of the present invention is explained. A specific UE is located at the inside of coverage of an eNB, transmits a D2DSS in accordance with timing provided by the eNB, and makes UEs located at the outside of the coverage of the eNB match synchronization with the D2DSS. Moreover, the UE can deliver not only synchronization delivered from the eNB via a D2DSS but also data received from the eNB to an external UE. The UE is referred to as a relay UE. According to the aforementioned operation of the present invention, the relay UE can use an SA pool separated from a UE located at the outside of the coverage of the eNB. By doing so, it is able to protect an SA of the relay UE from interference caused by the transmission of an SA transmitted by the UE located at the outside of the coverage of the eNB.

As a variation of the embodiment 1, while an SA resource pool is connected with a hop count, it may configure a resource in a form that a data transmission pool is shared. By doing so, interference between SAs can be identified according to a hop count. In case of data including an attribute more robust to interference using relatively more resources, it may be able to increase resource utilization by sharing a resource irrespective of a hop count.

Embodiment 2

In a second embodiment of the present invention, a case of configuring a common SA resource pool irrespective of a hop count is explained.

Figure 11:
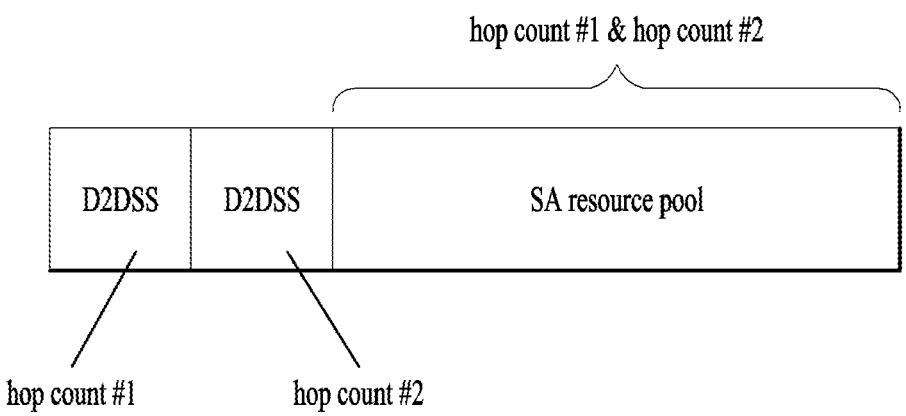
FIG. 11 is a diagram illustrating an example that a common SA resource pool is configured while a resource for transmitting a D2DSS is distinguished in every a hop count according to a second embodiment of the present invention.

FIG. 11 is a diagram illustrating an example that a common SA resource pool is configured while a resource for transmitting a D2DSS is distinguished in every a hop count according to a second embodiment of the present invention.

Referring to FIG. 11, it is able to see that a transmission resource of a D2DSS is distinguished according to a hop count but an SA resource pool is commonly used without distinction. Hence, although a UE is interlocked with a random D2DSS hop count, the UE uses an identical SA resource pool.

In this case, a size of an SA resource pool may change according to the maximum number of hops capable of relaying a D2DSS. Specifically, although it is able to determine the maximum number of hops capable of relaying a D2DSS in advance, the number may vary according to an initial D2DSS transmission UE or a configuration of an eNB. In this case, if the maximum number of hops increases, it is highly probable that more UEs use an identical SA resource pool in accordance with an identical synchronization source. Hence, in order to process SA transmission of more UEs, it is necessary to allocate more resources to an SA resource pool.

As an example, if a D2DSS is relayed up to maximum N hops, a size of an SA resource pool corresponding to a series of D2DSSs can be configured in proportion to the maximum hop count #N (e.g., a length of a time duration occupied by an SA resource pool can be configured in proportion to N). In this case, if a unit length is determined only in response to a time domain of an SA resource pool (e.g., if an initial UE or an eNB determines the unit length and signals the unit length via a D2D synchronization channel,) the unit length is combined with the maximum hop count #N and it is able to automatically configure a time domain of the whole of the SA resource pool.

Figure 12:
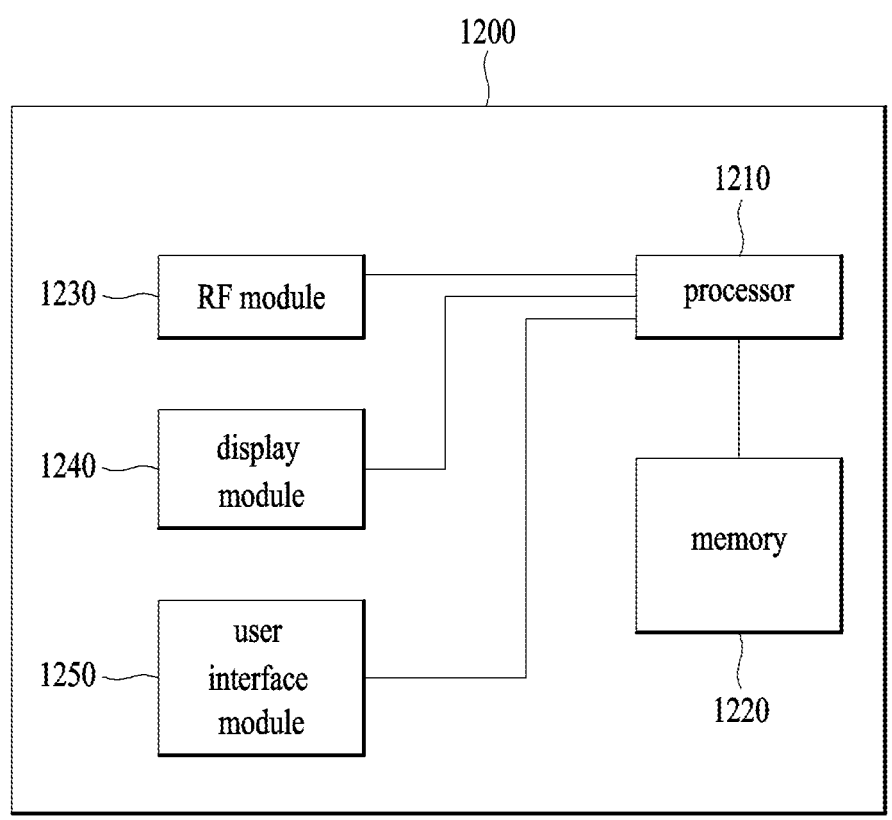
FIG. 12 is a block diagram for a communication device according to the present invention.

FIG. 12 is a block diagram of a communication apparatus according to an embodiment of the present invention.

Referring to FIG. 12, a communication apparatus 1200 includes a processor 1210, a memory 1220, an RF module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present invention described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transmitting a synchronization signal for direct device-to-device communication in a wireless communication system and an apparatus therefor are described with reference to examples applied to 3GPP LTE system, it may be applicable to various kinds of wireless communication systems as well as the 3GPP LTE system.

What is claimed is:

1. A method for transmitting and receiving, a user equipment, a signal through direct device-to-device communication in a wireless communication system, the method comprising:
   receiving a synchronization signal including a prescribed indicator indicating a count of relaying the synchronization signal from a specific node;
   selecting a scheduling assignment (SA) resource for transmitting an SA signal from an SA resource pool corresponding to the prescribed indicator; and
   transmitting the SA signal using the selected SA resource,
   wherein the SA resource pool is independently configured by each of values of the prescribed indicator.

2. The method of claim 1, further comprising:
   selecting a data channel resource from a data channel resource pool; and
   transmitting a data channel using the selected data channel resource,
   wherein the data channel resource pool is commonly configured by a value of the prescribed indicator.

3. The method of claim 2, wherein the SA signal comprises information on the selected data channel resource.

4. The method of claim 1, wherein the prescribed indicator further indicates whether the specific node transmitting the synchronization signal is located in a coverage area.

5. The method of claim 1, further comprising:
   relaying the synchronization signal including the prescribed indicator to a different node.

6. The method of claim 1, further comprising:
   relaying the synchronization signal to a different node,
   wherein an indicator included in the synchronization signal has a value increased as much as a predetermined value compared to the prescribed indicator.

7. A user equipment performing direct device-to-device communication in a wireless communication system, the user equipment comprising:
   a radio frequency (RF) module configured to transceive a signal with a specific node; and
   a processor configured to process the signal,
   wherein the processor is further configured to:
     control the RF module to receive a synchronization signal including a prescribed indicator indicating a count of relaying the synchronization signal from the specific node, and
     transmit a scheduling assignment (SA) signal using an SA resource selected from an SA resource pool corresponding to the prescribed indicator, and
   wherein the SA resource pool is independently configured by each of values of the prescribed indicator.

8. The user equipment of claim 7, wherein the processor is configured to control the RF module to transmit a data channel using a data channel resource selected from a data channel resource pool, and
   wherein the data channel resource pool is commonly configured by a value of the prescribed indicator.

9. The user equipment of claim 8, wherein the SA signal comprises information on the selected data channel resource.

10. The user equipment of claim 7, wherein the prescribed indicator further indicates whether the specific node transmitting the synchronization signal is located in a coverage area.

11. The user equipment of claim 7, wherein the processor is configured to control the RF module to relay the synchronization signal including the prescribed indicator to a different node.

12. The user equipment of claim 7, wherein the processor is configured to control the RF module to relay the synchronization signal to a different node, and
- wherein an indicator included in the synchronization signal has a value which is increased as much as a predetermined value compared to the prescribed indicator.

* * * * *